United States Patent Office 3,306,455
Patented Feb. 28, 1967

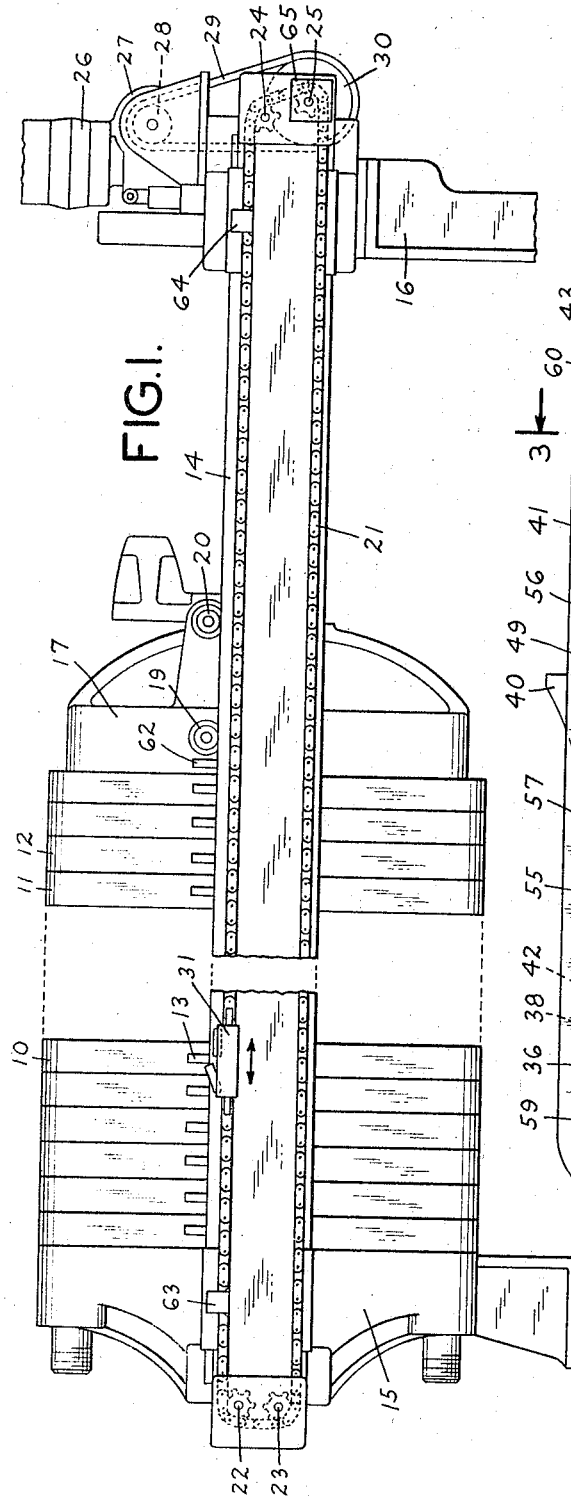
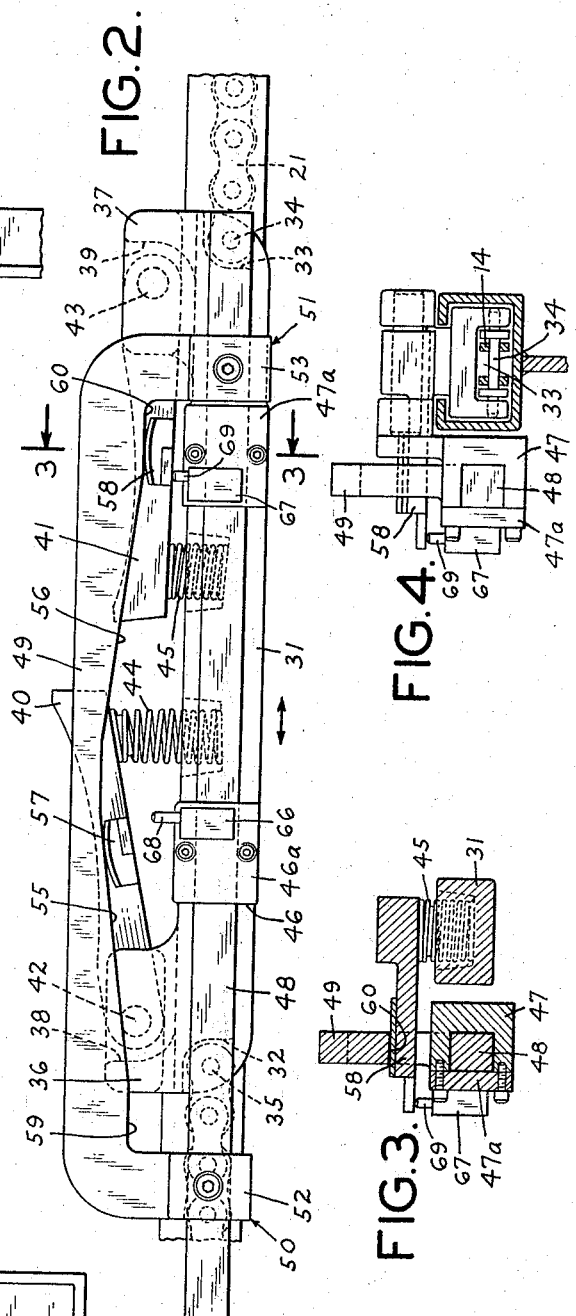

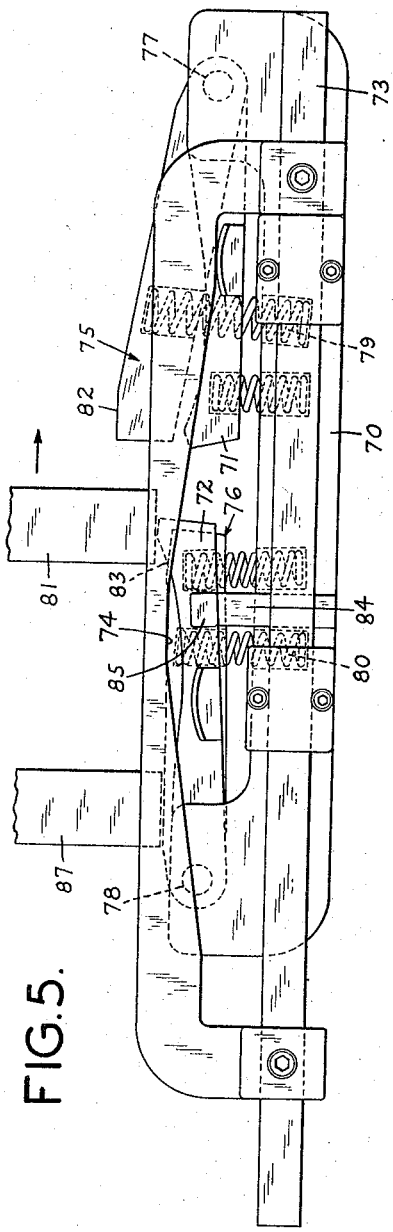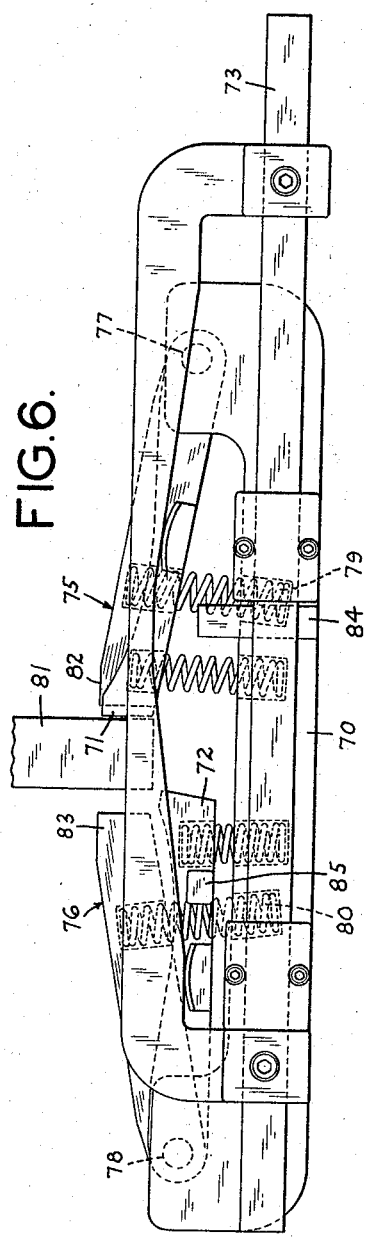

3,306,455
PLATE SELF-SHIFTER FOR FILTER PRESSES
William L. Fismer, Verona, N.J., assignor to T. Shriver & Company, Incorporated, Harrison, N.J., a corporation of New Jersey
Filed June 6, 1966, Ser. No. 555,434
11 Claims. (Cl. 210—230)

This invention relates to filter presses and more particularly to mechanisms for shifting the plates of filter presses to enable the filter cake to be removed therefrom.

A number of different types of plate shifters have been devised heretofore with a view to facilitating the shifting of filter plates, particularly the heavy filter plates used in larger filter presses. The mechanisms heretofore provided are complex and are subject to failure when, for example, the filter press becomes dirty with sludge and other contaminating materials accumulating on it and the shifting mechanism. Moreover, these complex devices are expensive to manufacture and difficult to service and maintain, and not readily installed on existing filter presses in the field.

In accordance with the present invention, a plate shifting mechanism is provided which is readily adapted for new or existing filter presses, either manual or automatic control, simple in structure, sturdy, and not adversely affected by the presence of the solids and liquids leaking or being discharged from the filter press.

More particularly, in accordance with the invention, a pair of plate shifting carriages are mounted on opposite sides of the frame of the filter press and are adapted to be moved lengthwise thereof by chains or any other suitable means, the carriages being provided with pawls which can be erected selectively to engage the handles or other extensions on the filter plates to enable them to be moved in one direction or the other for opening or closing the filter press under the control of the operator.

The carriages and the pawls thereon are of a simple, sturdy structure, the movement of the pawls not being appreciably affected by the presence of solids accumulating thereon or falling thereon for they are largely exposed and self-cleaning whereby they are capable of exercising their function of shifting the filter plates without jamming or being held out of position.

In order to raise and lower the pawls selectively, the carriage may be provided with a camming mechanism which can be shifted selectively at the ends of the path of travel of the carriages to engage one or the other of the pawls with the filter plates to separate the plates or move them together.

For a better understanding of the present invention, reference may be had to the accompanying drawings, in which:

FIGURE 1 is a side elevational view, partly broken away, of a typical filter press having a plate shifting mechanism of the type embodying the present invention thereon;

FIGURE 2 is a side elevational view of the plate shifting carriage;

FIGURE 3 is a view in section taken on line 3—3 of FIGURE 2;

FIGURE 4 is an end elevational view of the plate shifting carriage;

FIGURE 5 is a side elevational view of a modified form of carriage embodying the invention with portions of the filter plate shown therein; and FIGURE 6 is a side elevational view of the plate shifter shown in FIGURE 5 with the components thereof in a different position.

FIGURE 1 illustrates a conventional filter press including a plurality of filter press plates 10, 11, 12 etc., each provided with flanges or handles 13 on opposite sides thereof which support the filter plates on parallel longitudinal frame members 14. A filter press head 15 having legs supports the left hand ends of the frame members 14 while the other ends are mounted on a support 16 having legs. Movably mounted on the frame members 14 is the follower 17 of the filter press which may be provided with rollers 19 and 20 engaging the frame members 14 to enable the follower to be moved toward and away from the filter press head 15.

Extending along the outside of each of the longitudinal frame members 14 are chains 21 which are supported by means of sprockets 22 and 23 at the head of the filter and sprockets 24 and 25 at the opposite ends of the frame members. An electric motor 26 mounted on the support 16 above the frame members 14 drives, by means of a reducing gear 27 including a friction slip clutch, a sprocket 28 which is connected by means of a chain 29 to a sprocket 30 which is non-rotatably connected to the sprocket 25. The motor 26 is a reversible motor which can drive the chains 21 in either direction.

If desired, a hydraulic cylinder or a motor driven screw shaft may be provided for moving the follower 17 along the frame members 14, although in the filter press illustrated, such a cylinder or motor is not included.

Referring now to FIGURES 2 to 4, connected with the chains 21 are carriages 31 which may be in the form of an elongated casting having recesses 32 and 33 in its opposite ends for receiving the ends of the chain 21. Transverse pins 34 and 35 extend through the ends of the chain 21 and are mounted in the carriage spanning the recesses 32 and 33, as best shown in FIGURE 4.

The central portion of the carriage 31 is of generally rectangular cross-section and has upward extensions 36 and 37 at its opposite ends having recesses 38 and 39 therein for receiving the outer ends of a pair of pawls 40 and 41 which are pivotally supported on the carriage by means of the pivot pins 42 and 43, spanning the recesses and engaging in the extensions 36 and 37.

Both of the pawls 40 and 41 are normally biased upwardly by means of coil springs 44 and 45 having their lower ends engaging about the mid portion of the carriage and their upper ends engaging the pawls adjacent their inner ends. Other arrangements of the springs can be made.

Attached to the carriage are a pair of U-shaped guide members 46 and 47 which receive slidably a shifter bar 48 of non-circular cross-section such as, for example, square or rectangular, as shown in FIGURES 3 and 4. Cover plates 46a and 47a retain the bar 48 on the carriage. Attached to the shifter bar 48 is an inverted U-shaped cam member 49 having U-shaped arm portions 50 and 51 at its opposite ends for receiving the shifter bar 48 and being clamped thereto by means of clamping plates 52 and 53 so that the cam member 49 is fixed relative to and movable with the shifter bar 48. The shifter bar 48 is longer than the carriage 31 and accordingly, a portion of the shifter bar extends beyond the carriage 31 in all relative positions thereof. Formed on the U-shaped member are a pair of downwardly facing, inclined cam surfaces 55 and 56 which cooperate with outwardly extending fingers or arms 57 and 58 on the pawls 40 and 41, respectively. Adjacent the outer ends of the cam surfaces 55 and 56 are horizontally disposed surfaces 59 and 60, the purpose of which will be explained hereinafter. The relation of the cam member 49 and the pawls 40 and 41 is such that when the shifter bar 48 is moved to the left to the position shown in FIGURE 2, the pawl 41 is depressed and the finger 58 is in engagement with the horizontal surface 60 and does not tend to shift the cam 49 endwise while the pawl 40 is erected by its spring 44 into a position to engage a handle 13 on a filter plate, as shown in FIGURE 1. The pawl 41, on the other hand, is depressed below the lower edge of the handle 13, also as shown in FIGURE 1.

If the shifter bar is moved to the right, the pawl 40 will be depressed while the pawl 41 will be raised by means of its spring 45.

Assuming that the filter press is in filtering position, and the carriage 31 is to the right of the follower as viewed in FIGURE 1, the motor 26 is set into operation to drive to the left the upper flights of each of the chains 21 on opposite sides of the filter press. As the chains and the carriages move to the left, the raised pawl 40 will be forced down by engagement with the handle or lug 62 on the follower 17. After passing the lug 62, the pawl 40 will spring up behind it and upon reversal of the motor 26, the upper flight of the chains 21 and the carriages 31 thereon will move to the right, thereby engaging the end of the pawl 40 with the lug 62 and moving the follower to the right. When the follower 17 approaches the right-hand end of the frame members 14, the motor can be reversed and the carriage will then travel back to the left with the pawl 40 being depressed by the handle 13 on the filter plate adjacent to the follower. Upon the reversal of the motor 26, the end plate can then be moved over into contact with the follower or closely adjacent thereto. This operation can be repeated to move each of the plates individually, if desired, or a plurality of the plates, such as two or three or more, can be moved together along the frame members 14. When all of the plates have been moved to the right, and the filter cake removed therefrom, they can be returned into engagement with the head 15 of the filter press by moving the carriages 31 to the left until the shifter bar engages fixed stops 63 on the frame members which will cause the shifter bar and the cam 49 to be displaced to the right relative to the carriage 31, thereby depressing the pawl 40 and allowing the pawl 41 to be lifted by means of its spring 45.

The operations described above can then be reversed with the pawl 41 engaging the filter plate handles and finally lugs 62 on the follower 17 to restore the filter press to operating condition after locking the follower 17. Upon completion of this operation, the carriage may be moved to cause the shifter bar 48 to engage the stop 64 at the opposite end of the filter press, thereby shifting the cam 49 back to the position shown in FIGURE 2.

As indicated above, shifting of the plates can be accomplished under manual control, but it is also possible to make the plate shifting operation automatic in any of a number of ways. For example, a zero speed switch and relay 65 connected with the sprocket which will be actuated when the chain 21 is stopped by the resistance to its movement caused, for example, by bringing a plate up against the head 15 or the follower 17 of the filter press. Zero speed switches and relays 65 of the type mentioned are made by the Allen Bradley Company and described more particularly in the Allen Bradley Company Bulletin 808. An on-off switch connected with the relay 65 is used to start and stop the motor 26.

Reversal of the motor 26 must also take place when the carriage reaches a position to allow a pawl thereon to engage a plate handle for movement of a plate in a selected direction. Thus, as shown in FIGURE 1, when the carriage is moving to the left and the pawl 40 has just passed the handle 13, the direction of the carriage should be reversed to cause the pawl 40 to engage the handle and move the plate to the right. To that end, mounted on the carriage 31 at any suitable place such as, for example, on the cover plates 46a and 47a, are reversing switches 66 and 67 of the down-up type. These switches are inactive to change the direction of movement of the carriage by downward movement of the pawls 40 and 41 and depression of the switch plungers 68 and 69 but upward movement of the plungers actuates the switches to reverse the direction of the motor 26. A pawl and ratchet drive between each plunger and the switch contacts can produce the desired actuation of the switch. In this way, the carriage can be caused to reverse its movement either by action of the zero speed switch and relay 65 or by a downward and upward movement of either pawl 40 or 41. In these circumstances, it is only necessary for the operator to start the motor 26 after which the movement of the follower and the filter plates to the right or left, in sequence, will take place.

As shown in FIGURES 5 and 6, the carriage can be modified to enable automatic operation of the plate shifter making use of only the zero speed switch and relay 65 and doing away with the up-down switches 66 and 67. The carriage illustrated in FIGURES 5 and 6 is similar to the carriage 31 described above, including a carriage body 70, pivotally mounted spring-biased pawls 71 and 72, a shifter bar 73 and a cam 74 thereon. In addition, the carriage 70 is provided with a pair of stop levers 75 and 76 which are mounted on the pivot pins 77 and 78 supporting the pawls 71 and 72. Springs 79 and 80 are provided for biasing the stop levers 75 and 76 upwardly. As indicated in FIGURES 5 and 6, the opposed ends of the stop levers 75 and 76 are spaced apart a distance greater than the width of a plate handle 81 on the filter plate. Also, the inner, upper edges of the levers 75 and 76 are slightly tapered as at 82 and 83 to enable them to slide by the plate handles during operation. In addition, the shifter bar 73 is provided with an upwardly extending stop finger or post 84 for cooperation with a laterally projecting lug 85 on the pawl 72.

In operation, with the shifter bar 73 in the position shown in FIGURE 5, and with the chains traveling in a direction to move the carriage 70 to the left toward the filter press head, it will be apparent that as the carriage moves beneath a plate handle 81, the stop lever 76 will be depressed and will be held down when it passes beneath a handle 87 on an adjacent filter plate. The pawl 72 which is normally forced upwardly by its spring also will engage the handle 81 but can move down only a distance controlled by the post 84 and the lug 85. Inasmuch as these elements hold the inner end of the pawl 72 slightly above the frame on which the handle 81 rests, the handle and the filter plate will be lifted slightly to break it loose from any accumulation of solids on the frame members and also break it loose from an adjacent plate. Upon continued movement to the left, the stop lever 75 will engage the handle 81 and due to the imposed load on the motor driving the chain, will cause the zero speed switch and relay to reverse the direction of the motor and drive the carriage 70 to the right. Inasmuch as the pawl 72 has at this time moved up behind or to the left of the handle 81, movement of the carriage to the right will also move the filter plate to the right. Upon passing under a handle on a filter plate or under a lug on the filter press follower, the stop lever 75 will be depressed and upon reversal of the motor 26 by the imposed load of the filter plate being pushed by the pawl 72 against the follower or a plate thereagainst, the stop lever will move beneath the handle 81 so that the carriage can again move to the left to pick up another filter plate and move it toward the follower. It will be understood that the pawl 71 is depressed by the cam 74 below the bottom edge of the handle 81.

FIGURE 6 illustrates the positions of the elements of the carriage when moving a plate toward the left or toward the head of the filter press as view in FIGURE 1. In this position the pawl 72 is depressed by the cam 74 while the pawl 71 is spring-biased upwardly by means of its spring. In the shifted position of the plates toward the follower, it is unnecessary to break the plates loose before moving them back toward the press head and a lug corresponding to the lug 85 is not required on the pawl 71 although it can be provided if desired.

With stop levers on the carriages, the only operation required by the operator is to set the drive motor for the chains into operation, and shut it off at the end of a plate separating or plate closing operation.

The cam 74 on the carriage can be shifted by stop elements on the frame members as shown in FIGURE 1 of the drawings.

While the filter press is illustrated as provided with chains for moving the plate shifting carriages back and forth along the frame members 14, it will be understood that other equivalent mechanisms may be used for this purpose, such as, for example, threaded screw shafts on the frame and threaded followers on the carriage. However, chains are preferred because of their ability to be operated under conditions where sludge and other solids accumulations may occur. The exposed condition of the parts of the carriage and the fact that they are moved up and down numerous times during a plate shifting operation causes any sludge or other accumulations to be knocked off by such movement. Moreover the carriages can be washed off readily with a jet of water which may also be used for separating the cake from the filter plates.

Other modifications in the mechanism for driving the plate shifter and in the arrangement of the components thereof are possible and the examples of the plate shifters disclosed herein should be considered as illustrative. The invention, accordingly, is limited only as defined in the following claims.

I claim:

1. In a filter press having an enlongated frame, a filter press head fixed to one end of said frame, a follower movably mounted on said frame and a plurality of filter press plates supported by said frame between said head and said follower and movable along said frame; the combination therewith of a carriage movable lengthwise of said frame, means for reciprocating said carriage lengthwise of said frame, a pair of pawls mounted on said carriage and movable into raised and lowered positions, means for resiliently biasing said pawls to raised position, cam means mounted on said carriage for movement between two positions for selectively moving one of said pawls into said lowered position and enabling the other pawl to be biased to said raised position, and flange means on said filter plates engageable by a pawl in said raised position and out of engagement with the other pawl in said lowered position whereby reciprocation of said carriage along said frame moves said plates in one direction when said movable cam means is in one position and in the other direction when said cam means is in the other position.

2. The filter press set forth in claim 1 comprising a shifter member movable relative to said carriage and connected to said cam member for shifting said cam member between said two positions, and stop members adjacent opposite ends of said frame engageable with said shifter member to move it and said cam member between said two positions.

3. The filter press set forth in claim 2 in which said shifter member is a bar extending and shiftable lengthwise of said carriage and said cam member is an inverted U-shaped member fixed to said bar and having inclined cam surfaces engageable with said pawls.

4. The filter press set forth in claim 1 comprising means adjacent opposite ends of said carriage pivotally supporting said pawls.

5. The filter press set forth in claim 1 comprising stop levers having outer ends pivotally connected to opposite ends of said carriage and inner, spaced-apart, opposed free ends, said levers being substantially parallel with said pawls and movable downwardly beneath said flange means on said filter plates and upwardly into engagement with said flange means, and means for resiliently biasing said levers upwardly.

6. The filter press set forth in claim 1 in which said means for reciprocating said carriage comprises a reversible electric motor and switch means responsive to movement of a pawl from raised position to lowered position and lowered position to raised position for reversing said motor.

7. The filter press set forth in claim 6 comprising a zero speed reversing switch for reversing said electric motor.

8. The filter press set forth in claim 1 in which said pawl in said raised position is depressed by said flange means in one direction of movement of said carriage and is biased to said raised position to engage a flange in its path in the other direction of movement of said carriage.

9. The filter press set forth in claim 8 in which said means for reciprocating said carriage comprises a reversible electric motor and a zero speed switch for reversing said motor.

10. The filter press set forth in claim 8 in which said means for reciprocating said carriage comprises a reversible electric motor, a zero speed switch for reversing said motor and resiliently biased stop levers on said carriage for engaging said flange means on said plates to stop said carriage and actuate said zero speed switch to reverse said motor.

11. The filter press set forth in claim 8 comprising means on said carriage for limiting depressing of said pawl and lifting a filter plate by engagement of said pawl with a flange as said carriage moves in said one direction.

References Cited by the Examiner

UNITED STATES PATENTS

| 672,505 | 4/1901 | Critchlow | 210—230 |
| 3,153,630 | 10/1964 | Green | 210—230 |
| 3,232,435 | 2/1966 | Fismer | 210—230 |
| 3,251,472 | 5/1966 | Kurita | 210—230 |

FOREIGN PATENTS 920,379  3/1963  Great Britain.

REUBEN FRIEDMAN, *Primary Examiner.*

C. DITLOW, *Assistant Examiner.*